US011556842B2

(12) United States Patent
Mahmud et al.

(10) Patent No.: US 11,556,842 B2
(45) Date of Patent: Jan. 17, 2023

(54) DATA AUGMENTATION FOR TEXT-BASED AI APPLICATIONS

(71) Applicant: International Business Machines Corporation, Armonk, NY (US)

(72) Inventors: Jalal Mahmud, San Jose, CA (US); Zhe Liu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 16/510,951

(22) Filed: Jul. 14, 2019

(65) Prior Publication Data

US 2020/0372404 A1 Nov. 26, 2020

Related U.S. Application Data

(63) Continuation of application No. 16/416,837, filed on May 20, 2019.

(51) Int. Cl.
*G06N 20/00* (2019.01)
*G06F 3/01* (2006.01)
*G06F 16/2457* (2019.01)

(52) U.S. Cl.
CPC .............. *G06N 20/00* (2019.01); *G06F 3/01* (2013.01); *G06F 16/24575* (2019.01)

(58) Field of Classification Search
CPC .......................... G06N 20/00; G06F 16/24575
See application file for complete search history.

(56) References Cited

U.S. PATENT DOCUMENTS

| 4,969,097 A | * | 11/1990 | Levin | ...................... G06F 3/023 400/98 |
| 5,724,457 A | * | 3/1998 | Fukushima | ............ G06V 30/32 382/187 |
| 5,805,159 A | * | 9/1998 | Bertram | ................ G06F 3/0237 345/169 |

(Continued)

OTHER PUBLICATIONS

The Australian Computer Society, "Artificial Intelligence—A Starter Guide to the Future of Business", Syndey, Australia (2018).

(Continued)

*Primary Examiner* — Nicholas Augustine
(74) *Attorney, Agent, or Firm* — Stephen R. Yoder

(57) ABSTRACT

A cognitive system (artificial intelligence) is optimized by assessing different data augmentation methods used to augment training data, and then training the system using a training set augmented by the best identified method. The augmentation methods are assessed by applying them to the same set of training data to generate different augmented training data sets. Respective instances of the cognitive system are trained with the augmented sets, and each instance is subjected to validation testing to assess its goodness. The validation testing can include multiple validation tests leading to component scores, and a combined validation score is computed as a weighted average of the component scores using respective weights for each validation test. The augmentation method corresponding to the instance having the highest combined validation score is selected as the optimum augmentation method for the particular cognitive system at hand.

7 Claims, 5 Drawing Sheets

(56) References Cited

U.S. PATENT DOCUMENTS

| | | | | |
|---|---|---|---|---|
| 5,864,340 | A * | 1/1999 | Bertram | G06F 40/274 |
| | | | | 715/780 |
| 5,959,629 | A * | 9/1999 | Masui | G06F 3/04886 |
| | | | | 715/708 |
| 6,002,390 | A * | 12/1999 | Masui | G06F 3/04886 |
| | | | | 715/810 |
| 6,321,158 | B1 | 11/2001 | DeLorme | G06Q 10/047 |
| | | | | 701/426 |
| 6,337,698 | B1 * | 1/2002 | Keely, Jr. | G06F 3/0483 |
| | | | | 715/779 |
| 6,675,169 | B1 * | 1/2004 | Bennett | G06F 16/9024 |
| 7,171,353 | B2 * | 1/2007 | Trower, II | G06F 3/0237 |
| | | | | 715/256 |
| 7,194,404 | B1 * | 3/2007 | Babst | G06F 40/274 |
| | | | | 704/10 |
| 7,387,457 | B2 * | 6/2008 | Jawerth | G06F 1/1622 |
| | | | | 400/489 |
| 7,447,627 | B2 * | 11/2008 | Jessee | G06F 40/242 |
| | | | | 715/255 |
| 7,689,684 | B2 * | 3/2010 | Donoho | H04L 67/53 |
| | | | | 709/224 |
| 8,015,482 | B2 * | 9/2011 | Simova | G06F 40/169 |
| | | | | 715/230 |
| 8,396,582 | B2 * | 3/2013 | Kaushal | G06N 5/04 |
| | | | | 700/100 |
| 9,536,052 | B2 | 1/2017 | Amarasingham et al. | |
| 9,892,192 | B2 | 2/2018 | Chandrasekaran et al. | |
| 10,034,645 | B1 * | 7/2018 | Williams | A61B 5/165 |
| 10,388,272 | B1 * | 8/2019 | Thomson | G10L 15/22 |
| 10,467,122 | B1 * | 11/2019 | Doyle | G06Q 20/207 |
| 10,467,261 | B1 * | 11/2019 | Doyle | G06F 16/248 |
| 10,528,329 | B1 * | 1/2020 | Doyle | G06F 8/31 |
| 10,573,312 | B1 * | 2/2020 | Thomson | G10L 15/187 |
| 10,705,796 | B1 * | 7/2020 | Doyle | G06N 5/003 |
| 10,719,301 | B1 * | 7/2020 | Dasgupta | G06K 9/6267 |
| 10,978,056 | B1 * | 4/2021 | Chai | G06F 16/3344 |
| 11,017,778 | B1 * | 5/2021 | Thomson | H04M 3/42382 |
| 11,030,485 | B2 * | 6/2021 | Karam | G06V 10/7715 |
| 2002/0015042 | A1 | 2/2002 | Robotham | G06F 3/1454 |
| | | | | 345/581 |
| 2002/0024506 | A1 * | 2/2002 | Flack | G06F 1/163 |
| | | | | 345/169 |
| 2002/0052900 | A1 * | 5/2002 | Freeman | G06F 3/0237 |
| | | | | 715/262 |
| 2002/0156864 | A1 * | 10/2002 | Kniest | H04L 67/04 |
| | | | | 709/227 |
| 2004/0239681 | A1 * | 12/2004 | Robotham | G06F 3/14 |
| | | | | 345/581 |
| 2005/0012723 | A1 * | 1/2005 | Pallakoff | G06F 1/1656 |
| | | | | 345/173 |
| 2005/0195221 | A1 * | 9/2005 | Berger | G06F 16/9577 |
| | | | | 345/660 |
| 2005/0223308 | A1 * | 10/2005 | Gunn | G06F 3/04886 |
| | | | | 707/999.1 |
| 2005/0283364 | A1 * | 12/2005 | Longe | G10L 15/24 |
| | | | | 704/E15.041 |
| 2006/0020904 | A1 * | 1/2006 | Aaltonen | G06F 3/0482 |
| | | | | 715/850 |
| 2006/0026521 | A1 * | 2/2006 | Hotelling | G06F 3/04883 |
| | | | | 715/702 |
| 2006/0026535 | A1 * | 2/2006 | Hotelling | G06F 3/0488 |
| | | | | 715/863 |
| 2006/0026536 | A1 * | 2/2006 | Hotelling | G06F 3/04883 |
| | | | | 715/863 |
| 2006/0088356 | A1 * | 4/2006 | Jawerth | G06F 3/0237 |
| | | | | 400/472 |
| 2006/0095842 | A1 * | 5/2006 | Lehto | G06F 40/242 |
| | | | | 715/259 |
| 2006/0101005 | A1 * | 5/2006 | Yang | G06F 16/9537 |
| 2006/0161870 | A1 * | 7/2006 | Hotelling | G06F 3/0412 |
| | | | | 715/863 |
| 2006/0161871 | A1 * | 7/2006 | Hotelling | G06F 3/0485 |
| | | | | 715/862 |
| 2006/0265648 | A1 * | 11/2006 | Rainisto | G06F 3/0237 |
| | | | | 715/256 |
| 2006/0274051 | A1 * | 12/2006 | Longe | G06F 40/232 |
| | | | | 345/173 |
| 2007/0061704 | A1 * | 3/2007 | Simova | G06F 40/169 |
| | | | | 715/256 |
| 2007/0263007 | A1 * | 11/2007 | Robotham | G06F 3/1454 |
| | | | | 345/581 |
| 2015/0379429 | A1 * | 12/2015 | Lee | G09B 5/00 |
| | | | | 706/11 |
| 2017/0206797 | A1 | 7/2017 | Solomon et al. | |
| 2017/0286833 | A1 | 10/2017 | Ho et al. | |
| 2019/0129732 | A1 * | 5/2019 | Sivertson | G06N 7/005 |
| 2019/0130305 | A1 * | 5/2019 | Sivertson | G06N 20/00 |
| 2019/0304157 | A1 * | 10/2019 | Amer | G06V 20/41 |
| 2019/0318099 | A1 * | 10/2019 | Carvalho | G06F 21/577 |
| 2019/0324780 | A1 * | 10/2019 | Zhu | G06N 3/08 |
| 2020/0175961 | A1 * | 6/2020 | Thomson | G10L 15/28 |
| 2020/0184376 | A1 * | 6/2020 | Parameswaran | G06N 5/003 |
| 2020/0372395 | A1 * | 11/2020 | Mahmud | G06F 16/24575 |

OTHER PUBLICATIONS

Fadaee, Marzieh, et al., "Data Augmentation for Low-Resource Neural Machine Translation", Proc. Assoc. for Computational Linguistics, v. 2, pp. 567-573 (2017).

Hu, Zhiting, et al., "Toward Controlled Generation of Text", Int'l. Conf. on Machine Learning, v. 70, pp. 1587-1596 (2017).

Huang, Guangpu, et al., "Machine Translation Based Data Augmentation for Cantonese Keyword Spotting", IEEE Int'l. Conf. on Acoustics, Speech and Signal Processing, pp. 6020-6024 (2016).

ip.com, "System and Method of Variable and Logic analytics for test driven development", pub. No. IPCOM000245207D (2016).

ip.com, "Method and System for Estimating and Improving Assessments, Surveys and User Testing", pub. No. IPCOM000253166D (2018).

Kafle, Kushal, et al., "Data Augmentation for Visual Question Answering", Proc. Int'l. Conf. on Natural Language Generation, pp. 198-202 (2017).

Lemley, Joseph, et al., "Smart Augmentation Learning an Optimal Data Augmentation Strategy", IEEE Access, v 5, pp. 58585869 (2017).

Risch, Julian, et al., "Aggression Identification Using Deep Learning and Data Augmentation", Proc. Workshop on Trolling, Aggression and Cyberbullying, pp. 150-158 (2018).

IBM Appendix P, "List of patents and patent applications treated as related", Filed Herewith, 2 pages. Jul. 14, 2019.

* cited by examiner

DATA AUGMENTATION FOR TEXT-BASED AI APPLICATIONS

CROSS-REFERENCE TO RELATED APPLICATION

This application is a continuation of copending U.S. patent application Ser. No. 16/416,837 filed May 20, 2019.

BACKGROUND OF THE INVENTION

Field of the Invention

The present invention generally relates to cognitive systems (artificial intelligence), and more particularly to a method of optimizing a cognitive system using augmented training data.

Description of the Related Art

A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feedforward neural network based on animal visual perception, and so is particularly useful in processing image data. Convolutional neural networks are similar to ordinary neural networks but are made up of neurons that have learnable weights and biases.

There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these and other machine learning algorithms.

A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

As part of this effort, many systems employ some form of natural language processing to provide a more intuitive interface for a user to issue commands and queries to a computer system. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the Watson™ cognitive technology.

One important aspect of cognitive systems is training and validation which are critical to ensure the quality of a system. The type of training used depends on the particular type of cognitive system involved. For a text-based system, the training data might take the form of question-and-answer pairs, i.e., a question having a corresponding answer which is identified as being correct ("good") or incorrect ("bad"). For an image-based system, the training data might be image/object pairs, i.e., an input picture having a subject which is identified as being an animal, plant, or inanimate object. For an aural-based system, the training data might use audio clips which are identified as being human speech, vehicle sounds, or ambient auditory features. Training data is typically provided by subject matter experts for the particular domain of the cognitive system. The manner in which the training data is specifically provided may also related to the type of cognitive system. For example, in NLP systems the input data may be subject to text analysis. Text analysis is known in the art pertaining to NLP and typically uses a text annotator program to analyze text relative to a defined set of tags. The text annotator can generate linguistic annotations within the document to tag concepts and entities that might be buried in the text. Other forms of analysis are used for other types of cognitive systems, e.g., image-based or aural-based.

FIG. 1 shows a generalized procedure 10 for training and validation of a cognitive system 11. Cognitive system 11 takes a set of training data 12 and applies it to its input algorithms to learn from the data. The training data set is thus used to help form the basis of the system's logic, e.g., adjust the weightings on a neural network. The result is a trained cognitive system 14. A set of validation data 15 can then be submitted to trained cognitive system 14. A validation set can be used to minimize overfitting, i.e., not necessarily adjusting the weightings of the network but just verifying accuracy over the training data. There are a variety of validation tests that can be used for this purpose. The result is a validation score 18 which indicates whether additional training may be required. A test set can further be used for evaluation of the final system setup (not shown) in order to confirm the actual predictive power of the network.

Training cognitive systems preferably involves the use of hundreds or thousands of input examples. It is consequently not always easy to construct a good training set. One approach designers have devised to address this problem is to take an existing set of data that is already considered good for training purposes, and augment that data in various ways. For example, one or more words in a sentence can be replaced with a synonym using a reference source (thesaurus) to create a new sentence. Another approach is to swap certain words or otherwise change word order, such as changing the sentence "He had the flu in 2018" to "In 2018 he had the flu". There are many other conventional data augmentation methods.

SUMMARY OF THE INVENTION

The present invention in at least one embodiment is generally directed to a method of optimizing training of a cognitive system by receiving a training data set of a type adapted for training the cognitive system, applying a plurality of different data augmentation methods to the training data set to generate a plurality of augmented training data sets, training respective instances of the cognitive system with the augmented training data sets, validating each trained instance to obtain a plurality of validation scores each associated with a respective one of the data augmentation methods, ranking the data augmentation methods according to the validation scores, selecting an optimum one of the data augmentation methods based on the ranking, and training a final instance of the cognitive system using the optimum data augmentation method. For an embodiment wherein the cognitive system is text-based, the data augmentation methods can include dictionary-based text replacement, Word2Vec text generation, sentence paraphrasing, and back-translation. The selection can be automatic, choosing the data augmentation methods having the highest validation score. In the illustrative implementation, the validating includes applying a plurality of different validation tests to a given trained instance to determine a plurality of respective component scores for the given trained instance, and the validation score is a combination of the component scores. For example, the validation score can be a weighted average of the component scores using respective weights for each validation test. In the embodiment wherein the cognitive system is text-based, the validation tests can include syntactic variation, grammatical quality, readability, accuracy gain, and vocabulary gain. Once the cognitive system has been so optimized, it may perform its intended operation, such as a deep question/answer system which receives a user query and responsively provides an answer to the user query.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
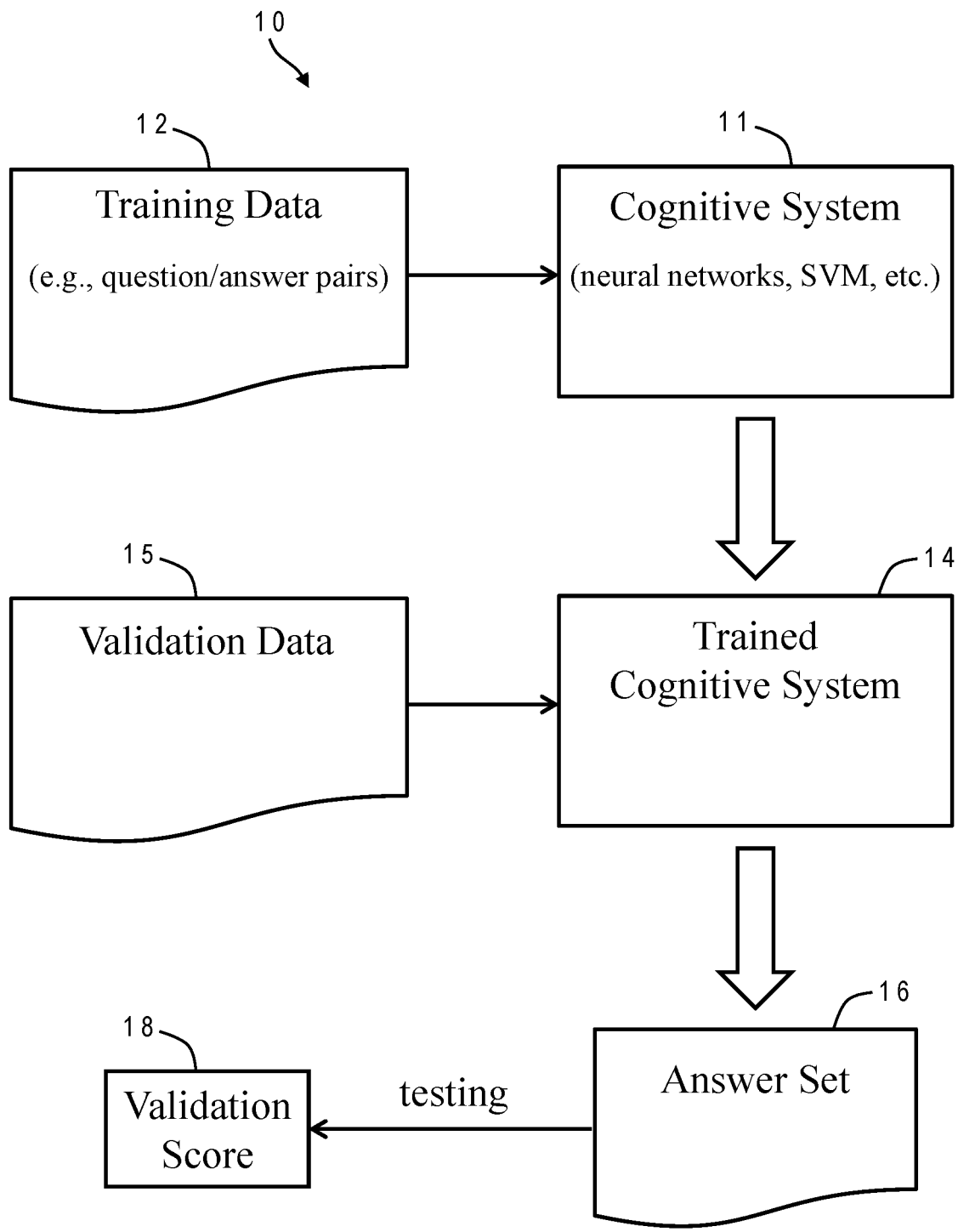
FIG. 1 is a block diagram of a conventional training and validation process for a cognitive system.

As noted above, data sparsity is a common problem for training machine learning algorithms. Techniques for augmenting data have been explored by researchers for various domains such as text, image and speech. However, existing methodologies for data augmentation only provide additional data in an ad hoc approach, where selecting a particular data augmentation method and amount of augmented data is arbitrary. What might be good augmentation for one cognitive system is not necessarily good augmentation for a different cognitive system. While some systems show improvement of accuracy as a result of data augmentation, there is no systematic method that can determine the optimum data augmentation methods for a particular cognitive system.

It would, therefore, be desirable to devise an improved method of augmenting data for training a cognitive system which could apply a set of augmentation approaches with different parameters, control the validation process, and select the best augmented model for a particular cognitive system. It would be further advantageous if the method could operate in an automated manner. The present invention in its various embodiments achieves these and other advantages by computing a superior augmented model from a set of candidate augmented models generated through selection of augmentation methods, parameter variations, and training set size variation for augmentations, and computing goodness scores for each of the augmented models through a set of features. A data scientist provides the input training and test data, a machine learning model for the specific application (e.g., a business or engineering problem), an initial set of augmentation methods, and optionally a set of parameters associated with each augmentation method. Data augmentation engines apply a set of augmentation methods as specified in the input and, using the parameter/rule specified, select the data to be augmented, augment the data and generate augmented training data sets. For each set of augmented data, a machine learning model is trained. A validation engine then computes a set of scores for each of the augmented models by applying different test sets that can include the original test set and augmented test set which contain augmented vocabulary or other features. Each augmented model thereby gets a set of scores, such as accuracy gain from base model on original test set, accuracy gain from base model on augmented test set, vocabulary gain comparing to base model, grammatical quality of augmented data, syntactic variation of augmented data, readability of augmented data, etc. These scores can be weighted to form a combined score; weights can be determined via separate machine learning. This combined score represents a goodness of each augmented model. A ranking engine ranks each of the augmented models according to their scores and returns the ranked list to data scientist. The data scientist may select the best ranked augmented model or rerun the augmentation assessment by changing parameters as desired. Alternatively, the process can automatically select the augmented model with the highest combined score.

Figure 2:
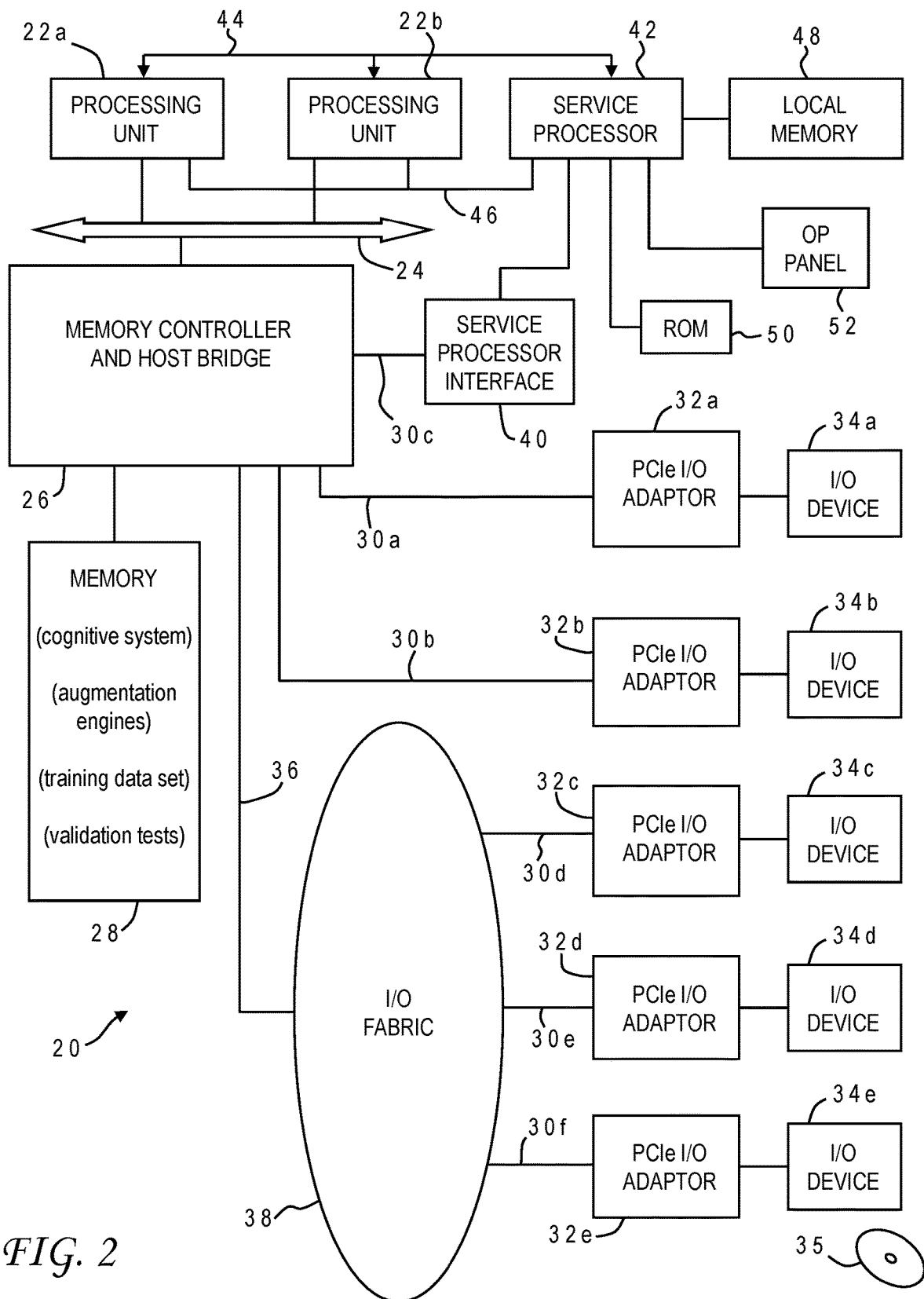
FIG. 2 is a block diagram of a computer system programmed to carry out training and validation of a cognitive system in accordance with one implementation of the present invention.

With reference now to the figures, and in particular with reference to FIG. 2, there is depicted one embodiment 20 of a computer system in which the present invention may be implemented to carry out the assessment of data augmentation methods for cognitive systems. Computer system 20 is a symmetric multiprocessor (SMP) system having a plurality of processors 22a, 22b connected to a system bus 24. System bus 24 is further connected to a combined memory controller/host bridge (MC/HB) 26 which provides an interface to system memory 28. System memory 28 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 28 has loaded therein one or more applications in accordance with the present invention, such as the particular cognitive system or artificial intelligence (AI) which is the subject of the training, various augmentation engines, one or more training data sets, and a series of validation tests adapted to the particular type of cognitive system at hand.

MC/HB 26 also has an interface to peripheral component interconnect (PCI) Express links 30a, 30b, 30c. Each PCI Express (PCIe) link 30a, 30b is connected to a respective PCIe adaptor 32a, 32b, and each PCIe adaptor 32a, 32b is connected to a respective input/output (I/O) device 34a, 34b. MC/HB 26 may additionally have an interface to an I/O bus 36 which is connected to a switch (I/O fabric) 38. Switch 38 provides a fan-out for the I/O bus to a plurality of PCI links 30d, 30e, 30f. These PCI links are connected to more PCIe adaptors 32c, 32d, 32e which in turn support more I/O devices 34c, 34d, 34e. The I/O devices may include, without limitation, a keyboard, a graphical pointing device (mouse), a microphone, a display device, speakers, a permanent storage device (hard disk drive) or an array of such storage devices, an optical disk drive which receives an optical disk 35 (one example of a computer readable storage medium) such as a CD or DVD, and a network card. Each PCIe adaptor provides an interface between the PCI link and the respective I/O device. MC/HB 26 provides a low latency path through which processors 22a, 22b may access PCI devices mapped anywhere within bus memory or I/O address spaces. MC/HB 26 further provides a high bandwidth path to allow the PCI devices to access memory 28. Switch 38 may provide peer-to-peer communications between different endpoints and this data traffic does not need to be forwarded to MC/HB 26 if it does not involve cache-coherent memory transfers. Switch 38 is shown as a separate logical component but it could be integrated into MC/HB 26.

In this embodiment, PCI link 30c connects MC/HB 26 to a service processor interface 40 to allow communications between I/O device 34a and a service processor 42. Service processor 42 is connected to processors 22a, 22b via a JTAG interface 44, and uses an attention line 46 which interrupts the operation of processors 22a, 22b. Service processor 42 may have its own local memory 48, and is connected to read-only memory (ROM) 50 which stores various program instructions for system startup. Service processor 42 may also have access to a hardware operator panel 52 to provide system status and diagnostic information.

In alternative embodiments computer system 20 may include modifications of these hardware components or their interconnections, or additional components, so the depicted example should not be construed as implying any architectural limitations with respect to the present invention. The invention may further be implemented in an equivalent cloud computing network.

When computer system 20 is initially powered up, service processor 42 uses JTAG interface 44 to interrogate the system (host) processors 22a, 22b and MC/HB 26. After completing the interrogation, service processor 42 acquires an inventory and topology for computer system 20. Service processor 42 then executes various tests such as built-in-self-tests (BISTs), basic assurance tests (BATs), and memory tests on the components of computer system 20. Any error information for failures detected during the testing is reported by service processor 42 to operator panel 52. If a valid configuration of system resources is still possible after taking out any components found to be faulty during the testing then computer system 20 is allowed to proceed. Executable code is loaded into memory 28 and service processor 42 releases host processors 22a, 22b for execution of the program code, e.g., an operating system (OS) which is used to launch applications and in particular the data augmentation assessment program of the present invention, results of which may be stored in a hard disk drive of the system (an I/O device 34). While host processors 22a, 22b are executing program code, service processor 42 may enter a mode of monitoring and reporting any operating parameters or errors, such as the cooling fan speed and operation, thermal sensors, power supply regulators, and recoverable and non-recoverable errors reported by any of processors 22a, 22b, memory 28, and MC/HB 26. Service processor 42 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 20 carries out program instructions for an assessment process that uses a novel approach for identifying an optimum augmentation method for a given cognitive system. Accordingly, a program embodying the invention may additionally include conventional aspects of various cognitive system tools including data augmentation methods, and these details will become apparent to those skilled in the art upon reference to this disclosure.

Figure 3:
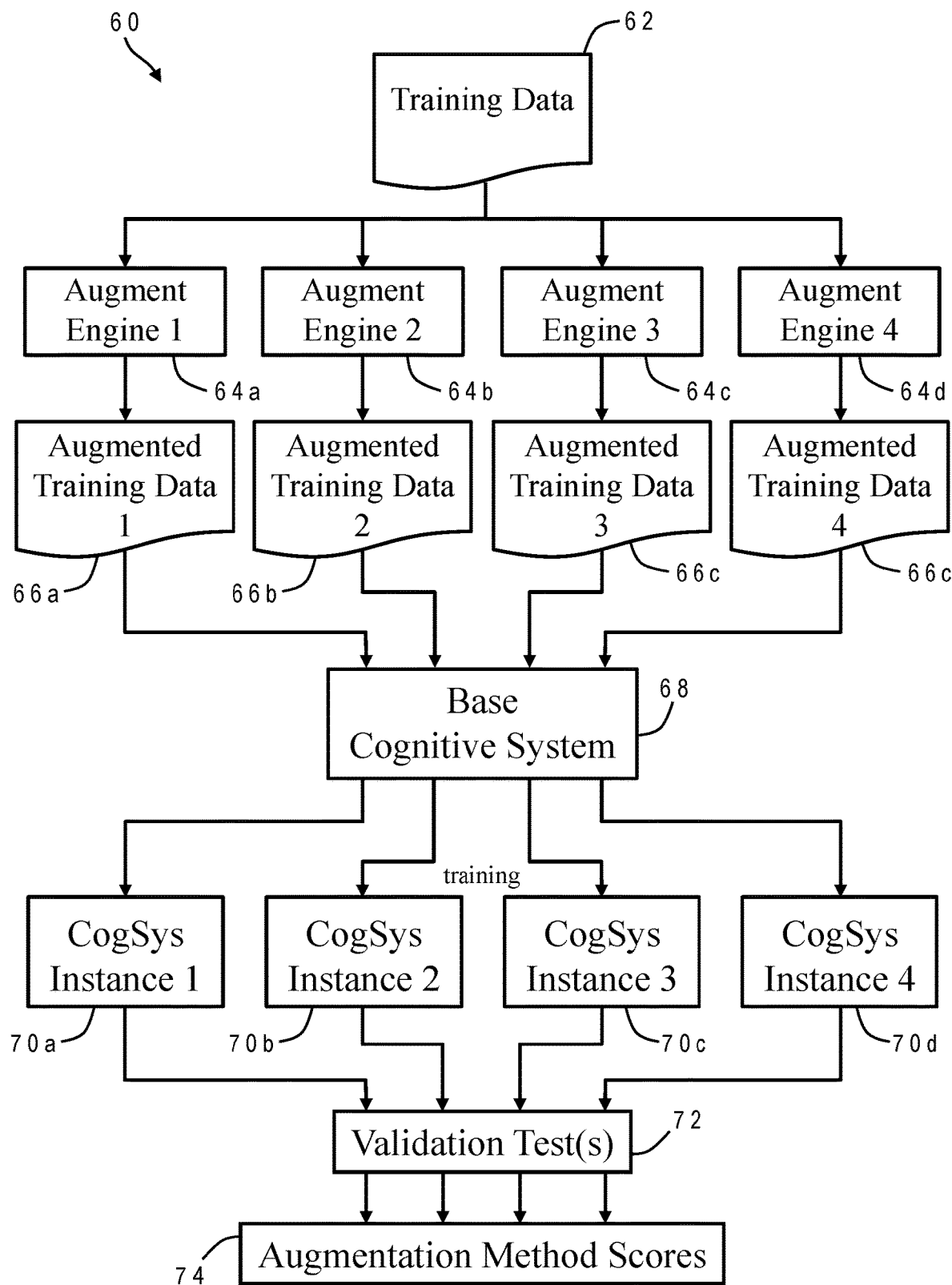
FIG. 3 is a block diagram of a data augmentation assessment procedure in accordance with one implementation of the present invention.

Referring now to FIG. 3, there is depicted an augmentation assessment environment 60 in accordance with one implementation of the present invention. Environment 60 has at least one set of training data 62; as will be explained further below, multiple different training sets could be used in a more advanced implementation. Training data 62 may be of any form suitable for the cognitive system to be optimized, and is provided by the data scientist. Training data 62 is acted upon by a plurality of augmentation engines. In this example only four engines 64*a*-64*d* are depicted, but there could be more (or fewer) engines. Each augmentation engine augments training data 62 according to a particular augmentation methodology, to yield augmented training data 66*a*-66*d*, i.e., the first augmentation engine generates a first set of augmented training data, the second augmentation engine generates a second set of augmented training data, etc. The particular augmentation methods being assessed can also be selected by the data scientist.

For a text-based cognitive system (for example, natural language text or text obtained from speech-to-text transcripts), the following augmentation methods are deemed exemplary but are not limiting. Augmentation engine 64*a* augments training data 62 using dictionary-based replacement; augmentation engine 64*b* augments training data 62 using text generation; augmentation engine 64*c* augments training data 62 using paraphrased sentences; and augmentation engine 64*d* augments training data 62 using back translation.

In dictionary-based augmentation the data scientist supplies a dictionary which contains synonyms of words and a set of rules which indicates the part of training data which needs to be augmented. An example of one such dictionary is the word-net dictionary for English which contains synonyms of words. For dictionary based augmentation, different variations of augmented sets are generated from each sentence by replacing words by their synonyms.

In another embodiment, text augmentation is carry out with text replacement using Word2Vec or other language model. A Word2Vec model identifies the inherent contextual interdependence between words in text. It is a neural network based technique for learning vector representation of words, and helps discover meaningful subspaces occupied by related words in a term space.

In another embodiment for text augmentation, the data augmentation method generates paraphrased sentences from original sentences. State of the art paraphrase generation approaches can be used. This engine can further implement an end-to-end auto-generation approach with sentence attributes controlled. There are in particular existing methods in the domain of sentiment controlled text generation.

In another embodiment, a sentence can be translated to another language, and translated back to the original language to generate a new sentence. By using this back translation based method, variations can be added without losing the semantic meaning of the input sentences. Since intermediate languages for translation can be many, this also generates a set of variations of each input sentence. The particular language(s) can again be selected by the data scientist.

A data augmentation method could also be a combination of any of these or other methods. A hybrid approach of augmentation may be used where a part of training data 62 is augmented using method 1, another part of training data 62 is augmented using method 2 and so on. Selection of a specific augmentation method on a part of training data can be done randomly, or specified as an input parameter by data scientist.

While these are exemplary augmentation methods for text-based AI, those skilled in the art will appreciate that there are other conventional augmentation methods available for other types of cognitive systems (non-text).

Thus, given a training set, the engines apply various data augmentation methods which are given as input by data scientist on the training set to obtain augmented training sets. For each method to be applied, they can additionally generates different variations or subsets of the training set (e.g., 10% of random sample of training data, 50% of random sample of training data, 100% training data, 5% training data with input label "1", 5% training data with input label "2", etc). Data augmentation methods can be then applied to each such variation with the selected parameters for a particular method. The data scientist also gives as input how to generate the different variations of training sets. If no parameter is specified for an augmentation method, an augmentation engine chooses a set of default parameters, which can be any of the foregoing.

Each augmented training data set 66*a*-66*d* is then applied to a base cognitive system 68 to train multiple, separate instances of the system. Base cognitive system 68 can be a raw system, that is, with no prior training, or can be a system that has already undergone some training. The results for this example of FIG. 3 are accordingly four cognitive system instances 70*a*-70*d*. Each of these cognitive system instances is then subjected to validation testing 72, as further described below in conjunction with FIG. 4, yielding at least one validation score for each cognitive system instance. The scores 74 for all of the cognitive system instances can then be compared (ranked) to determine which instance appears to have improved the most from the data augmentation.

Figure 4:
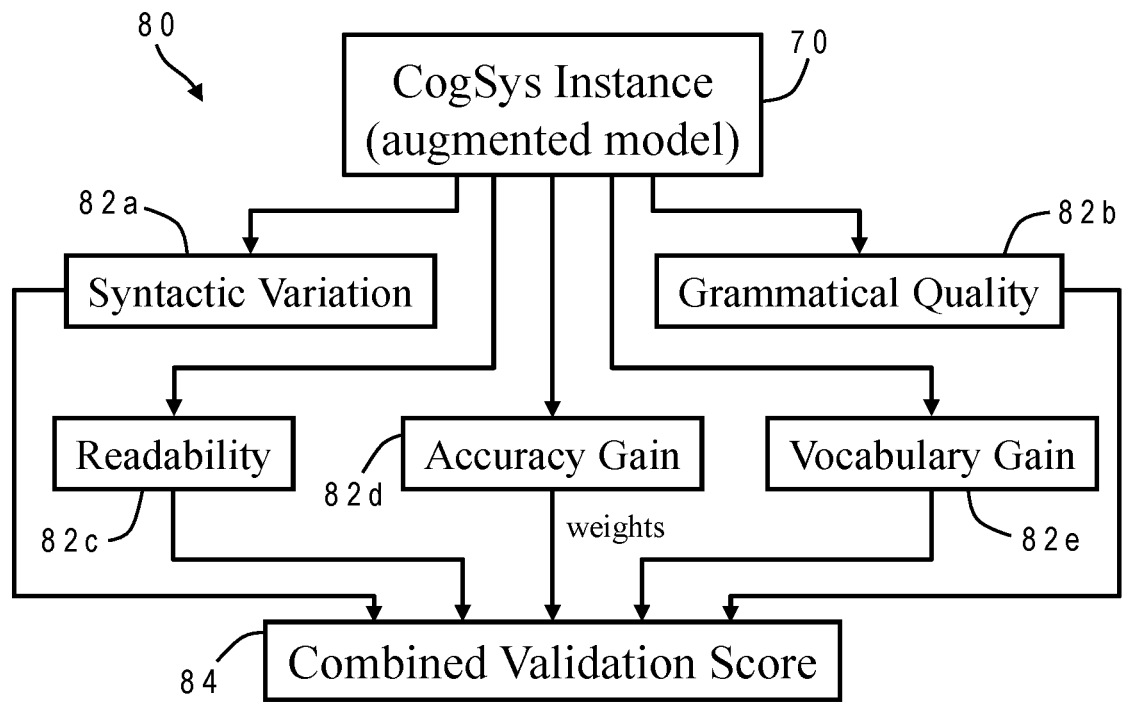
FIG. 4 is a block diagram showing how different validation tests can be used with weights to arrive at a combined validation score for a particular data augmentation method in accordance with one implementation of the present invention.

FIG. 4 shows one example of how validation testing 80 can be applied to a given cognitive system instance using multiple, varied validation tests to obtain a combined validation score. These tests may for example and without limitation include syntactic variation 82*a*, grammatical quality 82*b*, readability 82*c*, accuracy gain 82*d*, and vocabulary gain 82*e*, as well as variations thereof. All of these tests are conventional, but new validation tests could be used as well.

Syntactic variation testing 82*a* refers to variations in the syntax of the augmented model (cognitive system). Syntax generally refers to the structure of a sentence, particularly word order. Syntactic variation can be computed using a varieties of techniques such as the addition of new bi-grams or new tri-grams. Sentence length and change in dependency structure can also be used by constructing a dependency parse tree for each sentence.

Grammatical quality of the augmented model can be assessed through a state of the art grammatical quality check algorithm that returns a set of quality scores across a variety of grammatical dimensions, e.g., percentage of spelling error, percentage of punctuation error, percentage of preposition error, etc. When grammatical quality scores are computed for all sentences of augmented data, they can be averaged to get a single score for all dimensions.

Readability is computed through a state of the art readability checker that gives a readability score (e.g., readability index) to any given sentence. Scores for all of the sentences can again be averaged to get an overall readability score.

Accuracy gain can involve several different variations, such as accuracy gain compared to the base model on an original test set, or accuracy gain from a based model on an augmented test set. Accuracy gain from base model on an original test set is the difference in accuracy for an original test set when an original model and an augmented model are applied. The augmented model for the original test set is used to compute an accuracy score based on the augmented model's prediction on that test set. The same is done for the original model, and the difference is the accuracy gain. The difference can be positive, zero or negative (meaning accuracy decrease). As an example, for the business problem of predicting sentiment of text, the original training data could contain ten thousand examples, the test data could contain one thousand examples, and the model could be support vector machine based. Accuracy of the original model (trained from original training data) on the original test data might be 70%. Now if the ten thousand examples are augmented by another five thousand examples (the augmented training data contains fifteen thousand examples), the accuracy of the augmented model on the one thousand examples of test data might be 74%. So the accuracy gain is 4%.

Accuracy gain from base model on augmented test set is the difference in accuracy on an augmented test set when the original model and an augmented model are applied. For example, if the original test set has one thousand examples and they are augmented by another five hundred examples, then the augmented test set has fifteen hundred examples. The accuracy of the original model on the augmented test set might be 72% and the accuracy of the augmented model on the augmented test set might be 75%, so the accuracy gain is 3%. In another approach, a test set is created by taking augmented words and collecting sentences containing those words from varieties of sources such as social media, emails, essays, news. The sentences are then annotated (e.g., using a conventional text annotator) and the augmented model is applied to them to predict outcomes. Accuracy scores are computed based on the augmented model's prediction for that test set and also based on original model's prediction. The difference is the accuracy gain.

Vocabulary gain refers to the difference of vocabulary coverage of the original model, and augmented model. For example, if the original model has a vocabulary of twenty thousand words and the augmented model has a vocabulary of twenty-five thousand words, then the vocabulary gain is five thousand (or 25%).

Each of the validation tests results in a separate component score. These scores may be combined in various manners to arrive at a combined validation score for a particular augmentation method. In a simple implementation where the scores have been normalized, an average of the scores can be taken. In the preferred implementation, however, combined validation score 84 is a combination of the individual scores with respective weightings for each test, i.e., a weighted average of the scores. Such weights represent goodness of each augmentation method. So, such weights/goodness can be set by the data scientist. In another embodiment, the weights/goodness can be determined via machine learning where the data scientist trains a weight/goodness model for augmentation (this is a separate cognitive system). In order to train the machine learning model, the data scientist can collect ground truth examples of good (e.g., labeled as "1") and bad (e.g., labeled as '0') augmented models for a particular application, such as a business problem, over time. Once trained, such goodness model returns a goodness score (i.e., weights) for a particular augmented model.

Once a combined validation score 84 is computed for each augmented model, they can be ranked and presented to the data scientist via a display device or other I/O device of computer system 10. To facilitate explainability, the ranking list can also show each component of the combined validation score for a particular augmented model. The data scientist can select a data augmentation method based on these scores (i.e., the augmentation method used to train the best augmented model). Alternatively, computer system 10 can automatically selected an augmentation method by choosing the method corresponding to the highest-ranked validation score.

Figure 5:
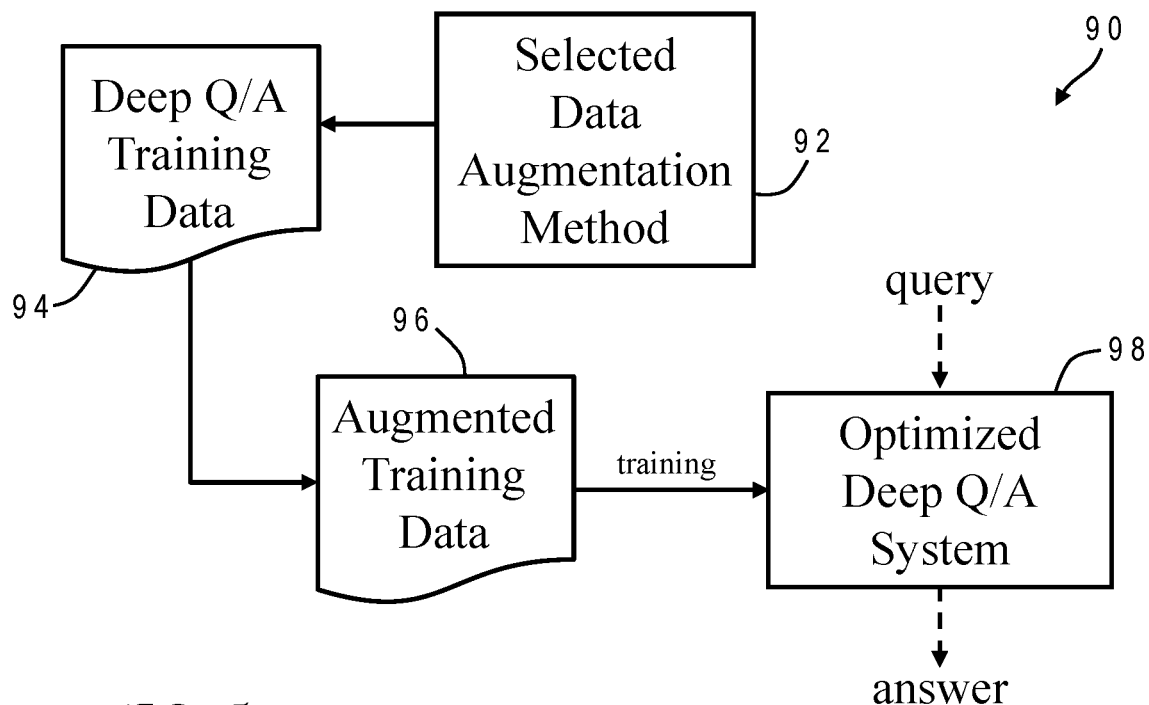
FIG. 5 is a block diagram depicting an exemplary application of the present invention with a deep question answering system optimized by use of a particular augmented training set in accordance with one implementation.

After selection of the optimum augmentation method, it can be used to construct a more comprehensive training data set for the cognitive system. FIG. 5 shows one example application 90 for a deep question/answer system which can be carried out on the same computer system 10. The selected data augmentation method 92 is applied to a training set 94, in this case a deep question/answer training set. This training set 94 could be the same as the earlier training set 62 used for augmentation assessment, but in the illustrative implementation it is a different training set. In particular the training data used for validation testing of the different augmentation methods could be of a limited nature, while the training data for the final cognitive system is more comprehensive. The result is an augmented training data set 96 which is then used to train the cognitive system, yielding an optimized deep question/answer 98. A user can submit a query to optimized deep question/answer system 98, e.g., in a natural language form. The NLP engine of optimized deep question/answer system 98 can then process the query and apply it to the trained system to provide one or more answers.

Figure 6:
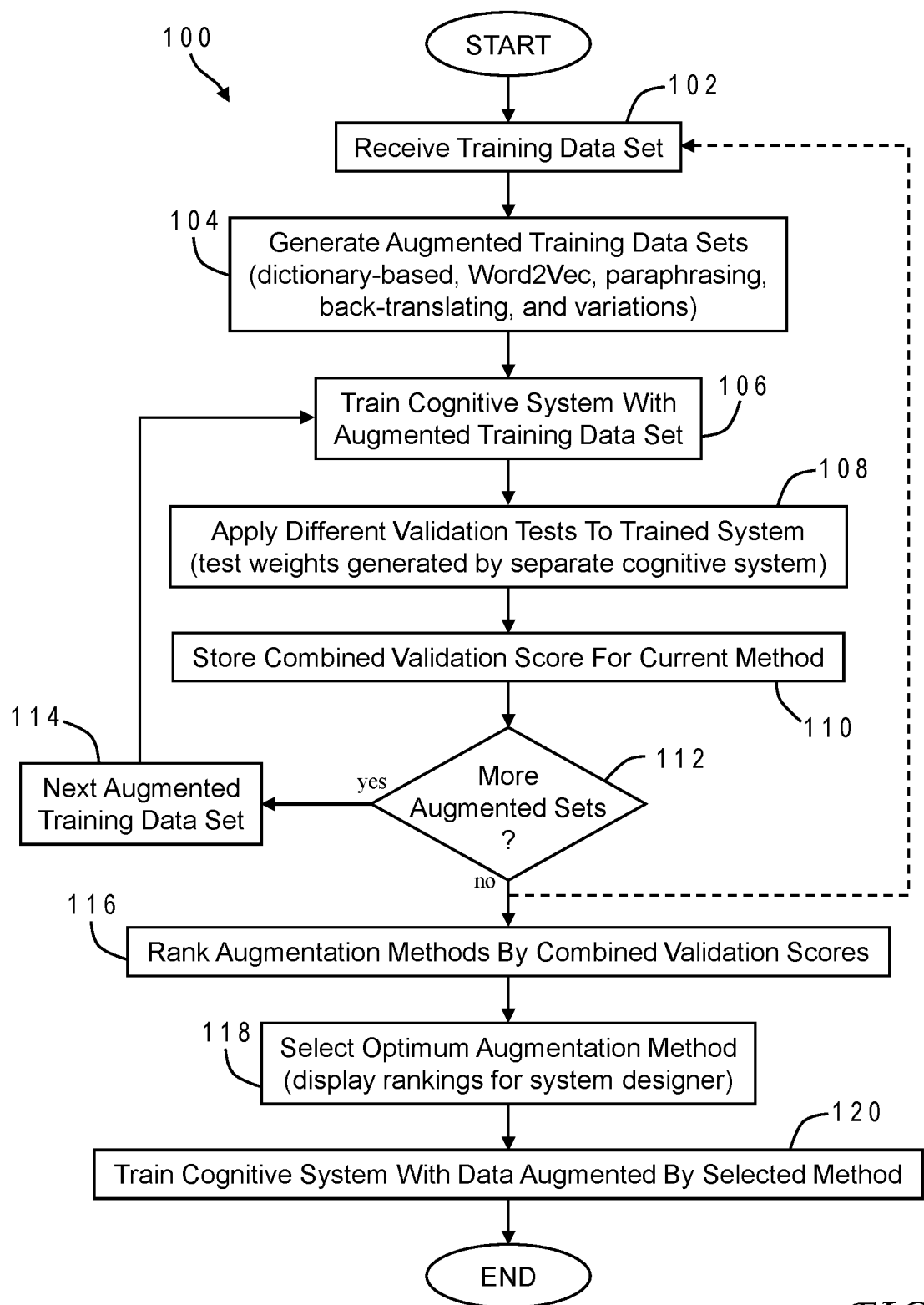
FIG. 6 is a chart illustrating the logical flow of an automated process for selecting an optimum data augmentation method for use in training a cognitive system in accordance with one implementation of the present invention.

The present invention may be further understood with reference to the chart of FIG. 6 which illustrates the logical flow of an automated process 100 for assessing data augmentation methods for cognitive system training data, which again can be carried out on a computer system such as computer system 10. Assessment process 100 begins when computer system 10 receives a training data set for the cognitive system (102). The training data takes a form suitable for the particular cognitive system involved, e.g., question/answer pairs for a text-based AI. A plurality of augmented training data sets are generated using various augmentation techniques (104). The augmented training data sets may also be different variations of a single augmentation method where one or more parameters are varied. The cognitive system is trained with the first set of augmented training data (106). The nature of the training involved again depends upon the particular type of cognitive system, e.g., a text-based AI may use tools such as text annotators, parse tree generators, etc., to classify the input variables. Different validation tests are applied to the trained cognitive system (108). Each validation test results in a score, and the scores are combined, preferably with weightings, to arrive at a combined validation score for the current method, which is then stored (110). If there are still more augmentation methods to test (112), the process moves to the next augmented training data set (114) and continues iteratively at box 106, training the cognitive system with the next set. Once all of the augmented training data sets have been processed, the augmentation methods are ranked according to their combined validation scores (116). Alternatively, the entire process up to this point can be repeated using different training data sets, as indicated by the dashed arrow returning to box 102 (combined validation scores from different training sets could be averaged to get overall scores for each augmentation method). The optimum augmentation method is then selected for deployment (118). This selection may be automatic, i.e., selecting the augmentation method having the highest combined score, or manual, i.e., letting the system designer select the method after reviewing the different scores and their components. The selected augmentation method is then used to fully train the cognitive system for regular operation (120). The flow of FIG. 6 thereby results in an optimized cognitive system which can then be used for its intended application, e.g., a deep Q/A system as shown in FIG. 5.

The present invention accordingly provides a superior approach for data augmentation in training of a cognitive system. As noted above, such training is critical to proper operation of cognitive systems, and itself constitutes a technical field. Training a cognitive system may be thought of as improving the performance of a tool, such as by sharpening a blade. There are various implements that can be used to hone a blade, but some will create a sharper edge. The present invention thus represents a significant improvement to the technical field of cognitive system training. The invention in at least some embodiments further allows the entire process to be automated such that an optimum augmentation method can be reliably identified for the particular cognitive system at hand.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention is not limited to text-based AI applications. It can be used with other types of cognitive systems (image-based, aural-based, etc.) provided there are ample data augmentation methods available for such systems. It is therefore contemplated that such modifications can be made without departing from the spirit or scope of the present invention as defined in the appended claims.

What is claimed is:

1. A method comprising:
receiving a training data set that is adapted for training a cognitive system;
applying a plurality of data augmentation methods to the training data set to generate a plurality of augmented training data sets;
for each given augmented training data set, training a respective cognitive system instance, with the trained cognitive system instance being associated with a corresponding data augmentation method used to generate the augmented training data set on which the cognitive system instance was trained;
validating each trained cognitive system instance to obtain a set of validation score(s), with the validation of each trained cognitive system instance including:
determining, by a machine learning module, a set of weight(s) corresponding to each validation score of the set of validation score(s), with each validation score of the set of validation score(s) being associated with the data augmentation method corresponding to the trained cognitive system instance being validated, and with the set of validation score(s) being based, at least in part, upon a plurality of validation tests, and
using the set of weight(s) corresponding to each validation score of the set of validation score(s) to determine a weighted average validation score for the plurality of validation tests;
ranking the plurality of different data augmentation methods according to the validation score of the respectively corresponding cognitive system instance;
selecting an optimum one of the plurality of different data augmentation methods based on the ranking;
training a final cognitive system instance of the cognitive system using the selected data augmentation method; and
processing a user query to obtain an answer for the user query, with the answer for the user query being based, at least in part, upon the final cognitive system instance.

2. The method of claim 1 wherein the cognitive system is text-based, and the data augmentation methods include at least dictionary-based text replacement, Word2Vec text generation, sentence paraphrasing, and back-translation.

3. The method of claim 1 wherein the selecting automatically selects one of the data augmentation methods having a highest validation score.

4. The method of claim 1 wherein the validating includes applying a plurality of different validation tests to a given trained instance to determine a plurality of respective component scores for the given trained instance, and the validation score is a combination of the component scores.

5. The method of claim 4 wherein the validation score is a weighted average of the component scores using respective weights for each validation test.

6. The method of claim 4 wherein the cognitive system is text-based, and the plurality of validation tests include at least syntactic variation, grammatical quality, readability, accuracy gain, and vocabulary gain.

7. The method of claim 1 wherein the cognitive system is a deep question/answer system, and further comprising:
receiving a user query at the final cognitive system instance, with the user query at the final cognitive system instance being in a natural language form; and
providing an answer to the user query using the final cognitive system instance.

* * * * *